US012558885B2

(12) United States Patent
Klages et al.

(10) Patent No.: US 12,558,885 B2
(45) Date of Patent: Feb. 24, 2026

(54) TECHNIQUE FOR MARKING A PROLATE OBJECT

(71) Applicant: Phoenix Contact GmbH & Co. KG, Blomberg (DE)

(72) Inventors: Kilian Klages, Detmold (DE); Alexander Hofmann, Hameln (DE); Markus Traenkle, Dauchingen (DE); Benjamin Aberle, Dunningen (DE); Markus Kiefer, Freiburg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 490 days.

(21) Appl. No.: 17/764,999

(22) PCT Filed: Oct. 6, 2020

(86) PCT No.: PCT/EP2020/077958
§ 371 (c)(1),
(2) Date: Dec. 16, 2022

(87) PCT Pub. No.: WO2021/069415
PCT Pub. Date: Apr. 15, 2021

(65) Prior Publication Data

US 2023/0278327 A1 Sep. 7, 2023

(30) Foreign Application Priority Data

Oct. 9, 2019 (BE) .................................. 2019/5666

(51) Int. Cl.
*B41F 19/02* (2006.01)
*B41J 3/38* (2006.01)
(Continued)

(52) U.S. Cl.
CPC ................ *B41F 19/02* (2013.01); *B41J 3/38* (2013.01); *B41J 3/4075* (2013.01); *B41J 3/445* (2013.01);
(Continued)

(58) Field of Classification Search
CPC .. B41F 19/02; B41J 3/38; B41J 3/4075; B41J 3/445; B41J 29/393; B65C 3/02; H01B 13/34; H01B 13/344
See application file for complete search history.

(56) References Cited

U.S. PATENT DOCUMENTS

2003/0146943 A1 8/2003 Lehmkuhl et al.
2004/0206459 A1 * 10/2004 Schanke .............. B65C 9/1865 156/443

(Continued)

*Primary Examiner* — David H Banh
(74) *Attorney, Agent, or Firm* — LEYDIG, VOIT & MAYER, LTD.

(57) ABSTRACT

A device for providing a marking arranged or arrangeable in a circumferentially closed manner around a prolate object includes: a material interface for receiving a printed product output from a printer; a data interface for communicating with the printer for a providing or arranging of the marking as a communication; at least one actuator, using the printed product output from the printer, for arranging the marking on the object in a circumferentially closed manner or to provide the marking for circumferentially closed arrangement according to the communication with the printer via the data interface; and a memory readable by the printer via the data interface, the memory storing operational data of the providing or arranging.

23 Claims, 9 Drawing Sheets

(51) Int. Cl.

| | |
|---|---|
| ***B41J 3/407*** | (2006.01) |
| ***B41J 3/44*** | (2006.01) |
| ***B41J 29/393*** | (2006.01) |
| ***B65C 3/02*** | (2006.01) |
| ***H01B 13/34*** | (2006.01) |

(52) U.S. Cl.
CPC ............... *B41J 29/393* (2013.01); *B65C 3/02* (2013.01); *H01B 13/34* (2013.01); *H01B 13/344* (2013.01)

(56) References Cited

U.S. PATENT DOCUMENTS

| | | | | |
|---|---|---|---|---|
| 2004/0206460 | A1* | 10/2004 | Schanke | B65C 9/46 156/443 |
| 2004/0211522 | A1 | 10/2004 | Fries et al. | |
| 2006/0065722 | A1* | 3/2006 | Hayashi | G06Q 10/00 235/383 |
| 2006/0109298 | A1* | 5/2006 | Lee | B41J 2/1652 347/22 |
| 2007/0028061 | A1* | 2/2007 | Takehana | H04N 1/00127 714/E11.138 |
| 2008/0073023 | A1 | 3/2008 | Fries et al. | |
| 2015/0254479 | A1* | 9/2015 | Kifuku | G06K 15/1809 358/1.6 |
| 2016/0165092 | A1* | 6/2016 | Abe | H04N 1/32786 358/1.15 |
| 2017/0186343 | A1* | 6/2017 | Hansen | B65C 9/0006 |
| 2017/0242996 | A1* | 8/2017 | Kang | G06F 21/34 |
| 2019/0001703 | A1* | 1/2019 | Nampo | B41J 11/42 |

* cited by examiner

TECHNIQUE FOR MARKING A PROLATE OBJECT

CROSS-REFERENCE TO PRIOR APPLICATIONS

This application is a U.S. National Phase application under 35 U.S.C. § 371 of International Application No. PCT/EP2020/077958, filed on Oct. 6, 2020, and claims benefit to Belgian Patent Application No. BE 2019/5666, filed on Oct. 9, 2019. The International Application was published in German on Apr. 15, 2021 as WO/2021/069415 under PCT Article 21(2).

FIELD

The invention relates to a technique for marking a prolate object, for example a conductor. In particular, the invention relates to a device for providing a marking that is arranged or arrangeable in a circumferentially closed manner around a prolate object, as well as to a printer for outputting a printed product to such a device.

BACKGROUND

For marking (i.e., labeling) of, for example, electrical conductors, label printers are traditionally used for printing a label which after printing has to be manually mounted on the conductor. Document US 2003/146943 A1 describes a printer that alternately prints and cuts a label.

Furthermore, specific printers are known which may be used for marking conductors. Document US 2004/0211522 A1 describes a machine that winds, around a conductor, a pre-printed wrap-around label on a spindle roll. Document US 2008/0073023 A1 describes a monolithic machine for printing and applying wrap-around labels.

However, conventional devices may only print certain labels and, if an automated application is integrated, then no other printing applications are possible with such a device.

SUMMARY

In an embodiment, the present invention provides a device for providing a marking arranged or arrangeable in a circumferentially closed manner around a prolate object, comprising: a material interface configured to receive a printed product output from a printer; a data interface configured to communicate with the printer for a providing or arranging of the marking as a communication; at least one actuator configured, using the printed product output from the printer, to arrange the marking on the object in a circumferentially closed manner or to provide the marking for circumferentially closed arrangement according to the communication with the printer via the data interface; and a memory readable by the printer via the data interface and configured to store operational data of the providing or arranging.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
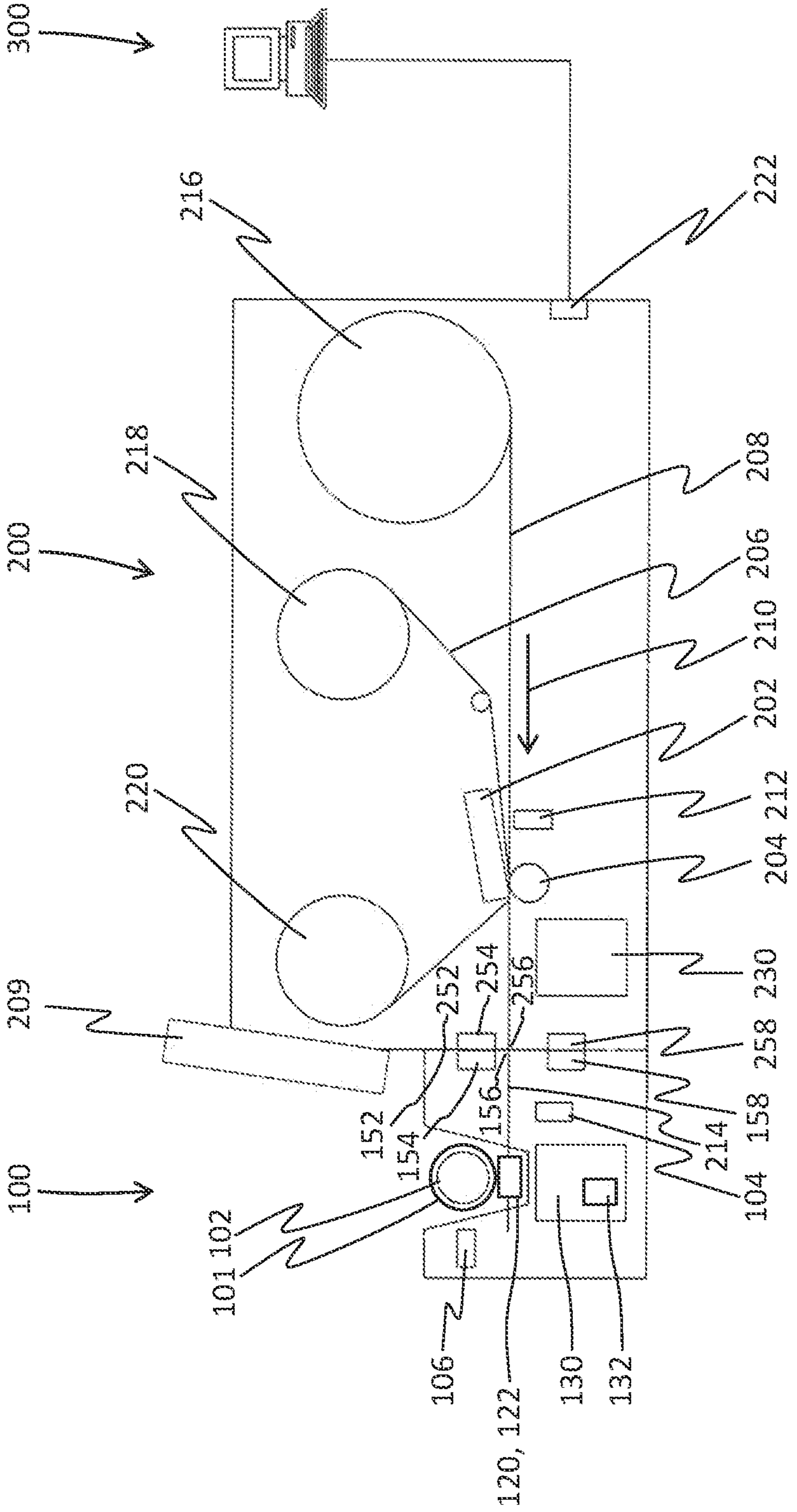
FIG. 1 a schematic sectional view of a first embodiment of a device for providing a marking attached to an embodiment of a printer.

In an embodiment, the present invention provides a device for a printing system preferably with the size and portability of a desktop device, so that the system may be converted in a short time to various applications of object marking, preferably various applications of conductor marking. An embodiment ensures the operability of the printing system, in particular the device.

A first aspect relates to a device for providing (or provisioning) a marking arranged or arrangeable in a circumferentially closed manner around a prolate object, preferably a conductor. The device comprises a material interface configured to receive a printed product output from a printer; a data interface configured to communicate with the printer to provide or arrange the marking; at least one actuator configured to arrange the marking on the object in a circumferentially closed manner or to provide the marking for circumferentially closed arrangement in accordance with the communication with the printer via the data interface using the printed product output from the printer; and a memory configured to be read by the printer via the data interface and configured to store operational data of the providing or arranging.

By storing the operational data in the device, embodiments of the device may continuously update the operational data even when the device and/or printer is changed. By making the operational data of the device accessible to the printer via the data interface, the printer may display (for example, via a display of the printer or a computer connected to the printer) the operational data and/or warn and/or prompt for maintenance (for example, for installation maintenance) upon or before the occurrence of a fault. Optionally, the printer or computer may determine a component of the device to be replaced based on the operational data and/or request it from a warehouse via network access.

The operational data may comprise counts, states (for example, operational states), state measurements, and/or histories of states or state measurements of the device, preferably of the at least one actuator.

The memory may be a non-volatile memory. The non-volatile memory may be a persistent memory or a read-only memory. The non-volatile memory may store the stored operational data (or operating data) after interrupting an electrical power supply.

The memory may be configured to store the operational data of the providing and/or arranging, preferably incrementally (for example as a counter) and/or time-dependently or in a temporal course (for example periodically or by storing the operational data together with a time stamp in each case).

The data interface may be configured to control, regulate, synchronize, and/or coordinate alternating and/or event-driven operation of the at least one actuator and the printer to provide or arrange the marking. The memory may be further configured to store and/or update the operational data during each alternating and/or event-driven operation of the at least one actuator.

The alternating and/or event-driven operation may also be referred to as an action. The alternating and/or event-driven operation may comprise an action of the at least one actuator (for example, cutting the printed product or arranging the marking) and/or an action of the printer (for example, printing a printed product as a printed product or feeding or retracting the printed product or the printed medium at the material interface). A material interface of the printer may comprise a drive for feeding the printed product output at the material interface.

The device may be configured to perform the providing or arranging of the marking in accordance with the communication with the printer. Communication of the device with the printer may be bidirectional.

Communication via the data interface may comprise received acknowledgement messages from the printer (for example, to complete an action of the printer) and/or control commands received via the data interface from the printer to arrange or provide the marking (for example, control commands to an action of the at least one actuator). Alternatively or additionally, the communication may comprise confirmation messages sent via the data interface from the device (for example, to complete an action of the at least one actuator) and/or control commands sent via the data interface from the device to the printer to output (preferably to feed or retract) the printed product when arranging or providing the marking.

The device may further comprise a control unit or regulating unit configured to control or regulate the at least one actuator of the device for the providing or arranging in accordance with communication with the printer via the data interface. Alternatively or additionally, the control unit or regulating unit may be configured to detect and/or write to memory the operational data of the provision or arrangement. Optionally, the operational data (or operating data) may indicate (or specify) an arrangement method of the device and/or a version of a firmware of the control unit or regulating unit of the device.

The arrangement method may also be referred to as the application (or the applying). The operational data may indicate (or specify) the arrangement method, for example the print medium on which the printed product is based. The operational data may indicate (or specify) the arrangement method, for example, marking using a tube, film, or wrap-around label.

The control unit or regulating unit of the device may be configured to control or regulate the operation (i.e., an action) of the at least one actuator. The control unit or regulating unit of the device may further be configured to detect and/or write to memory the operational data of the operation of the at least one actuator in the course of controlling or regulating the at least one actuator.

The control unit or regulation unit may execute the firmware to provide or arrange the marking.

A first actuator of the at least one actuator may be configured to cut the printed product for marking. The printed product may be output at the material interface in the longitudinal direction from the printer to the device (for example, during a feed of the printer). The first actuator may be configured to cut through the printed product in a transverse direction transverse (preferably perpendicular) to the longitudinal direction of the printed product.

A second actuator of the at least one actuator may be configured to arrange the marking on the object in a circumferentially closed manner using the cut printed product or to provide the marking for circumferentially closed arrangement.

The operational data may comprise an operating duration (or operating hours) or one or plurality of counts of the at least one actuator, preferably a number of cuts (or blanks) performed by the first actuator and/or a number of markings provided or arranged by the second actuator. Alternatively or additionally, the operational data may comprise a time history of the one state or the plurality of states.

The operational data may comprise one or plurality of states of the at least one actuator, preferably a temperature, an electrical voltage, and/or an electrical current of the at least one actuator. Alternatively or additionally, the operational data may comprise a time history of this one or these plurality of states.

The operational data may comprise one or plurality of state measurements of the at least one actuator, preferably a force-displacement course (also: force-displacement relation) of the at least one actuator. Alternatively or additionally, the operational data may comprise a time history of the one or the plurality of state measurements.

The device may further comprise a mechanical interface configured to detachably or irreversibly mount the device to the printer. Alternatively or additionally, the device may further comprise an electrical interface configured to supply electrical power to the device (preferably the control unit, the regulating unit, and/or the at least one actuator) via the printer. Optionally, the operational data may comprise one or plurality of states of the mechanical interface and/or the electrical interface, preferably an interlock position of the mechanical interface and/or an electrical voltage of the electrical interface, or a time course of this one or these plurality of states.

The data interface and/or the electrical interface may be arranged relative to the mechanical interface to contact the printer for communication or supply of electrical power, respectively, when the device is mounted to the printer using the mechanical interface.

The mechanical interface may be electromechanically lockable and/or unlockable. The control unit or regulating unit of the device (or a control unit or regulating unit of the printer) may further be configured to lock the mechanical interface before updating the firmware of the device via the data interface and/or to unlock the mechanical interface after updating the firmware of the device via the data interface.

The control unit or regulating unit of the device may be further configured to indicate an error or a request for maintenance via the data interface on a display, preferably a user interface, of the printer, for example, if the operational data (preferably one or a plurality of meter or counter readings) reaches or exceeds a limit value.

The control unit or regulating unit of the device may further be configured to forward the operational data to the printer via the data interface of the device and to a central computer via an interface of the printer (for example, for predictive maintenance of the device).

Optionally, the control unit or regulating unit of the device may be further configured to obtain a failure rate as a function of a meter or counter reading from the central computer via the data interface (and the printer interface). The function may represent a relationship determined based on operational data from a plurality of devices. The threshold value may be determined using the function according to a threshold value for the failure rate. Preferably, the threshold value may be changeable via the data interface at the user interface.

A second aspect relates to a printer for outputting a printed product to a device for providing a marking arranged or arrangeable closed around a prolate object, preferably around a conductor, in accordance with the device aspect (i.e., the first aspect). The printer comprises a material interface configured to output the printed product to the device; a data interface configured to communicate with the device for providing or arranging the marking; a control unit configured to control at least one actuator of the device by the communication via the data interface for circumferentially closed arrangement of the marking around the prolate object or for providing the marking circumferentially closed arrangeable around the prolate object by means of the output printed product; and a display, preferably a user interface, wherein the control unit or regulating unit is further configured to read out operational data of the providing or arranging from a memory of the device via the data interface and to output it using the display, preferably the user interface.

The display may comprise a touch-sensitive screen. For example, the display may be a user interface.

The read-out operational data may indicate an error in arranging or providing the marking. The control unit or regulating unit of the printer may be configured to indicate at least one option, selectable using the user interface, for servicing the device using the display, depending on the read-out operational data. The at least one selectable option may comprise a control system or regulation of the at least one actuator of the device for correcting the error or for maintenance.

The printer control unit or regulating unit may be configured to control or regulate the at least one actuator by communicating with a control unit or regulating unit of the device to provide or arrange the marking. Optionally, the operational data may specify an arrangement method of the device (i.e., a particular method for arranging the marking, also: application) and/or a version of a firmware of the control unit or regulating unit of the device. The firmware of the control unit or regulating unit of the device may also be referred to as the firmware of the device.

The control unit or regulating unit of the printer may be further configured to display at the user interface at least one of the following functions as a selectable option, and optionally to execute the respective function in response to the selection of the option using the user interface. A first function comprises a firmware update of the device, preferably if the printer has data access to firmware having a version more current than that indicated in the operational data. A second function comprises a service operation of the device, preferably wherein the at least one actuator of the device is manually controllable using the user interface or performs a homing operation. A third function comprises a change of a print medium of the printed product, preferably if a print medium inserted in the printer is not compatible with the arrangement method specified in the operational data.

The at least one selectable user interface option may comprise updating the firmware of the device via the data interface, for example, if the printer has data access to firmware of a version that is more current than the version specified in the operational data (in short, current firmware). For example, the operational data comprises a version number of the firmware of the device. The update of the firmware of the device may be indicated and/or selectable if the printer has data access to a firmware of a version number greater than the version number read out.

The printer may have data access to the current firmware by storing the current firmware in a memory of the printer, or by the printer having data access to the current firmware via an interface (for example, to a local storage medium), or by having data access to a local computer or a central computer (for example, a server) that provides the current firmware via network access.

The printer may further comprise a mechanical interface for mounting the device to the printer. The printer may further comprise electrical interface for supplying electrical power to the device. The data interface and/or electrical interface may make contact with the corresponding data interface or electrical interface, respectively, of the device when (for example, due to the relative arrangement just when) the device is mounted to the printer.

The control unit or regulating unit of the printer may be further configured to read user data in response to mounting of the device (for example, in response to making contact at the data interface and/or the electrical interface) and/or to display or execute (for example, without interaction at the user interface) an update of the firmware of the device as a selectable option at the user interface and/or to determine and/or display by means of the user interface a compatibility or incompatibility between the specified mounting method of the device and a print medium for the printed product loaded in the printer.

The printer control unit or regulating unit may be further configured to indicate an error or a request for maintenance using the display, preferably the user interface, if the read operational data, preferably one or plurality of meter readings (or counter readings), reaches or exceeds a threshold value.

The printer control unit or regulating unit may be further configured to communicate the operational data to a central computer via an interface of the printer (for example, for predictive maintenance of the device). Optionally, the printer control unit or regulating unit may be further configured to obtain a failure rate as a function of a count (for example, based on operational data from a plurality of devices) from the central computer via the interface. The control unit or regulating unit of the printer may further determine the threshold value using the function according to a threshold value for the failure rate. Preferably, the threshold value may be changeable using the user interface.

Another aspect relates to a system (also: printing system) for providing a marking arranged or arrangeable in a closed loop around a prolate object, preferably around a conductor. The system comprises a printer, preferably a thermal transfer printer, for outputting a printed product according to one embodiment of the printer aspect (i.e., the second aspect) and a device according to the device aspect (i.e., the first aspect). Corresponding interfaces of the printer and the device may each interact with each other. For example, the material interface may be arranged relative to the printer to receive the printed product output from the printer.

Alternatively or additionally, the device comprises a printing signal interface configured to detect a control signal for outputting the printed product. Alternatively or additionally, the device comprises at least one sensor configured to acquire (or detect) a control signal for providing the marking (or marking provision control signal). Alternatively or additionally, the at least one actuator is configured to arrange the marking on the object in a circumferentially closed manner or to provide the marking in a circumferentially closed manner using the printed product output by the printer, depending on the control signal for outputting the printed product and the control signal for providing the marking.

The device may be a device for circumferentially arranging a printed marking around a prolate object, preferably around a conductor.

The device may be configured as an applicator, annex (or stem) or attachment of the printer, in particular a thermal transfer printer. The device may be interchangeable. Each of a plurality of different embodiments of the devices may be selectively attachable to the same printer.

The printer may receive an identifier via an interface (e.g., a network interface or a serial interface). The printer may be configured to print the received identifier onto a print medium using a printing material. The printing material may comprise a color ribbon, for example for thermal transfer printing. The print medium (i.e., a print-on substrate or print-on material, i.e. a substrate or material to print on) may be a plastic film, for example for heat sealing or welding, or a heat shrink tube. The printed product may comprise the printed medium printed by means of the printing material.

The providing may comprise arranging the marking on the prolate object, preferably arranging the marking circumferentially about a longitudinal axis of the prolate object. The at least one actuator may be configured to arrange the printed marking circumferentially about a longitudinal axis of the object.

For example, the actuator may arrange or provide the marking when the control signal of the printing signal interface indicates the output of the printed product at the material interface and the control signal of the sensor indicates the presence of the object or a requested use to provide the marking.

The device and the printer may be arranged next to each other or side by side, for example without a direct mechanical connection. For example, the printer and device may each be arranged in a stationary and/or non-slip manner on the same work surface. For example, a material interface of the printer may be aligned or overlapping (or congruent) with or covered by the material interface of the device. There may be a clear gap between the printer and the device during operation.

The device may further comprise a mechanical interface configured to releasably or irreversibly attach (or mounted or fasten) the device to the printer.

The attachment (or mounting or fastening) may be irreversible, for example comprising a material connection (i.e., may be materially bonded). Alternatively, the device may be removably attached to the printer, such as being non-destructively detachable and/or attachable and/or detachable without tools.

The memory may be arranged on and/or in the device. The memory may be configured to store the operational data (for example, operational states) of the providing or arranging.

The operational data, or at least a portion of the operational data, may be transmitted from the device to a central computer or computer network (technically known as a "server" or "cloud"), for example, for analysis, processing, and/or storage in the central computer or computer network. The central computer may be part of the computer network.

The device may be configured to access the computer network via the data interface (i.e., via the printer), for example, to transmit the operational data or the portion of the operational data. Alternatively or additionally, the device may be configured to access the central computer or computer network directly or independently of the printer, for example, to transmit the operational data or the portion of the operational data. For example, the device may comprise a cellular modem configured to communicate wirelessly with a base station of a cellular network.

The central computer or computer network may receive the operational data or the part of the operational data from a plurality of devices.

The device (for example, its control unit or regulating unit) may further be configured to transmit the operational data (or the portion of the operational data) in connection with an identifier or ID of the device from the device to the central computer or computer network.

The identifier may enable data matching. The data comparison may enable an update or assignment of the transmitted operational data to operational data of the same device already stored by the central computer or the computer network. Alternatively or additionally, the identifier may enable statistical analysis of operational data from a plurality of different devices. For example, the control unit or regulating unit of the device may be further configured to obtain a failure rate as a function of a meter or counter reading of the device from the central computer or computer network via the data interface or radio modem. The function may represent a relationship determined based on operational data from a plurality of devices.

The identifier may be arranged, for example stored, in or on the device. The identifier may be mounted to the device using a housing of the device, a tag, a sticker, or a label (also referred to in technical terms as a "tag").

The housing, tag, sticker, or label may be configured for near-field communication, such as identification using electromagnetic waves (radio-frequency identification or RFID). Alternatively or additionally, the housing, tag, sticker, or label may indicate the identifier using an engraving, barcode, or QR code.

The printer (for example, its control unit or regulating unit) may be configured to detect the identifier (i.e., to recognize the device based on the identifier). The printer may be further configured to transmit the operational data to and/or retrieve the operational data from the central computer or computer network. For example, the printer or device is configured to partially or completely erase the operational data stored in the memory of the device after transmission.

The transmitted operational data may allow monitoring of maintenance and/or wear and/or operational status and/or use of the device and/or printer.

The at least one sensor of the control signal for providing the marking may be configured to sense (e.g., acquire) or detect the object, preferably to detect a presence, a location, and/or a size of the object.

The control signal for providing the marking may indicate the presence (i.e., the presence), the location, and/or the size of the object. The location may comprise a position and/or orientation of the object (for example, a longitudinal axis of the object). The size may comprise a length (for example, along the longitudinal axis), a width, a diameter, and/or a circumference of the object.

The at least one sensor of the control signal for providing the marking may detect the object without contact.

The at least one sensor of the control signal for providing the marking may comprise a push button. The control signal for providing the marking (also: control signal for the provision of the marking or marking provision control signal) may indicate an actuation of the button (also: provision request).

The control signal for providing the marking may indicate a user request for providing the marking. The control signal for providing the marking may be a trigger signal. The actuator may be configured to arrange the marking on the object in a circumferentially closed (e.g., loop) manner or to provide the marking for circumferentially closed arrangement in response to the detection of the object and/or the acquiring of the trigger signal.

The button may be a foot switch or a hand switch.

The printing signal interface may comprise a sensor configured to sense (e.g., detect or acquire) the output of the printed product output by the printer, preferably to sense (e.g., detect or acquire) a presence, a position, and/or a feed of the output printed product.

The sensor for detecting the output of the printed product (also: sensor for detecting the output of the printed product, or in short: sensor for detecting the printed product) may be arranged at the material interface. The sensor for detecting the printed product may detect the printed product without contact (i.e., contactless).

The at least one sensor may further comprise a sensor for detect the printed product output from the printer. Detecting the printed product may include sensing the presence, a location (e.g., position and/or orientation), and/or a size (e.g., length and/or diameter) of the printed product.

Alternatively or additionally, the print signal interface may comprise a data interface configured to communicate, preferably bidirectionally, with the printer for providing or arranging the marking.

The at least one actuator may be configured to (for example, in response to detecting the object and/or acquiring the trigger signal) process, in communication with the printer, the printed product output by the printer for marking and to arrange, or provide for arrangement of, the marking on the object.

The bidirectional communication may comprise receiving the control signal for outputting the printed product from the printer and sending a control signal for requesting output of the printed product to the printer. For example, the control signal for providing the marking may be forwarded to the printer via the data interface as a request for output of the printed product.

The printer may be configured to deliver the printed product to the device at the material interface, for example, in accordance with bidirectional communication and/or in response to the control signal to provide the marking.

The data interface may be configured for wireless communication, preferably using radio signals, infrared signals, and/or near-field communication.

The data interface may be configured to synchronize or coordinate an alternating and/or event-driven operation of the at least one actuator and the printer to provide or arrange the marking.

For example, a feed (e.g., feed forward) of the printed product performed by the printer may be alternately performed, synchronized, and/or coordinated with a cutting, folding, and/or wrapping of the output printed product. The respective sub-steps executed during alternating and/or event-driven operation by the device or the printer for the providing or the arranging of the marking may also be referred to as actions. The coordination of the sub-steps may also be referred to as action coordination.

The data interface may be configured to enable the printer to control the at least one actuator of the device, to read control signals from the at least one sensor and/or the printing signal interface of the device, and/or to read an identifier stored in the device.

The at least one actuator of the device may be controllable on the printer side using the data interface. Alternatively or additionally, measurands (or measured values) of the at least one sensor of the device may be queried (e.g., retrieved or requested) using the data interface.

The data interface may be electrically connected within the device to the at least one actuator and/or the at least one sensor.

The data interface may be configured to receive control commands for controlling or regulating the at least one actuator from the printer and/or to send control commands for controlling or regulating the printer to the printer based on the control signals from the at least one sensor and/or the printing signal interface.

The data interface may be electrically connected to the at least one actuator and/or the at least one sensor within the device via a control unit and/or a regulating unit. The control unit and/or regulating unit may determine parameters of the applicator from the acquired measured values. The control commands sent to the printer may comprise the parameters and/or control the printer according to the parameters.

The data interface may be configured to send control signals (for example, control commands and/or confirmation messages) from the at least one sensor and/or the printing signal interface, and/or parameters determined from the (aforementioned) control signals, to the printer for the providing or the arranging of the marking.

The device may further comprise a control unit or regulating unit configured to control or regulate the at least one actuator of the device depending on the control signals of the at least one sensor, measured values of the printer received via the data interface, confirmation messages of the printer received via the data interface, and/or control commands of the printer received via the data interface for arranging or providing the marking.

The control unit or the regulating unit may be further configured to obtain (e.g., receive) a control command from the printer via the data interface, to execute control or regulation of the at least one actuator in accordance with the control command, and to send a feedback to the printer via the data interface in response to completion of execution of the control command.

The feedback may comprise a confirmation of the (for example successful) completion of the execution of the control command or an error message regarding an error during the execution of the control command. For example, the feedback may inform the printer that a defined state of the device has been reached, such as an end position of the at least one actuator.

The control unit or regulating unit may further be configured to determine a parameter of the arranging based on the control signal detected or acquired by means of the at least one sensor, and to send the determined parameter to the printer via the data interface.

The detected or acquired control signal may be indicative of a diameter or circumference of the object. The determined parameter may be indicative of a length of a feed (e.g., an advance or feed forward) or a retraction of the printed product.

A control command sent from the device to the printer via the data interface may initiate the feed (e.g., advance or feed forward) or the retraction.

The control unit or regulating unit may autonomously perform the providing or arranging of the marking, or a substep of the providing or the arranging of the marking, in accordance with the control command during the time period between obtaining (e.g., receiving) the control command from the printer and sending the feedback to the printer.

The device may further comprise an electrical interface configured to supply electrical power to the device via the printer.

The data interface and/or the electrical interface may be arranged relative to the mechanical interface to contact the printer for communication or supply of electrical power to the device when the device is attached to the printer by means of the mechanical interface.

The data interface may be arranged relative to the mechanical interface to contact the printer for communication when the device is attached to the printer by the mechanical interface. The electrical interface may be arranged relative to the mechanical interface to contact the printer for power supply when the device is attached to the printer by the mechanical interface. For example, attaching (or mounting or fastening) the device to the printer by means of the mechanical interface may cause contacts of the data interface and/or the electrical interface to become connected.

The object may comprise a conductor or may be a conductor. The conductor may be a conductor (or electrical wire) or a light guide (or optical fiber).

The mechanical interface may comprise a centering pin or an opening for receiving a centering pin and/or a lever and an eccentric connected to the lever in a rotationally fixed manner, which eccentric is configured for attaching (or fastening) the device to the printer without screws and/or without tools.

Embodiments of the device, printer or system allow for a modular system (also: printing system) that may be based on a single printer, for example a desktop device, such that this printer may be converted in a short time or few steps to the different applications of object marking, preferably conductor marking. For example, a user can quickly and easily form a system from a normal or application-unspecific label printer for assisting in applying a marking (for example, a label) to the prolate object to be marked, preferably the conductor to be marked.

Herein, the terms application and applying (preferably as a process step) may be interpreted to be synonymous or interchangeable. The terms arrangement and arranging (preferably as a process step) may be interpreted herein to be synonymous or interchangeable.

Applying the marking on or to the prolate object (preferably on or to the conductor) may comprise arranging the marking on or at the prolate object. Providing the marking arranged or arrangeable in a circumferentially closed manner around the prolate object (preferably around the conductor) may comprise cutting (preferably trimming) the printed product.

The prolate object may be an elongated object. At least in sections, the prolate object may be a (for example, general) cylinder, preferably a circular cylinder or a prism.

The prolate object may have a longitudinal axis. An extent of the object in the direction of the longitudinal axis may be greater (for example, several times greater) than one or any extent of the object transverse or perpendicular to the longitudinal axis.

The prolate object may be a conductor, a tube, a vessel, or a housing. The conductor may be an elongated object for conducting signals or substances. For example, the conductor may be an elongated object for conducting electrical current and/or electromagnetic radiation (preferably light). The vessel may be a test tube or a sample tube, for example for holding and/or transporting a fluid.

The conductor may comprise one core or two, at least two, three or more cores (or wires) electrically insulated or optically decoupled from each other. The cores may be parallel to each other or may be twisted together (for example, in pairs).

The core or the conductor may be a single wire or a plurality of, fine and/or superfine stranded conductors.

The conductor may be a cable, cable bundle, and/or ribbon cable. The conductor may be a light guide (also: optical fiber or light guide cable). The conductor may be a tube and/or a fluid line or conduit.

The conductor may be a cylindrical body and/or a non-rotationally symmetric elongated body. The conduction of the signals or substances may be directed along a longitudinal axis of the conductor and/or may extend between ends of the conductor.

By allowing embodiments of the device for a specific application to be attached to a printer that is not specific to the application, special printers for the respective application, and thus costs, can be avoided and/or resources can be used more effectively. For example, a utilization rate of the printer may be increased as a result. The same or further embodiments of the device may reduce a downstream manual effort in mounting the printing materials on the objects to be marked.

FIG. 1 shows an embodiment of a device generally designated by reference numeral 100 for providing (for example, dispensing, arranging, and/or applying) a marking 101 arranged or arrangeable in a circumferentially closed manner around a prolate object 102, preferably around a conductor.

The device 100 comprises a material interface 156 configured to receive a printed product 214 output from a printer 200. Further, the device 100 comprises a data interface 158 configured to communicate with the printer 200 for providing or arranging the marking 101. Further, the device 100 comprises at least one actuator (for example, at least one of the actuators generally referred to herein as reference numerals 120 and 122) configured to arrange or provide the marking 101 on the object 102 in a circumferentially closed manner in accordance with communicating with the printer 200 via the data interface 158 using (for example, originating from) the printed product 214 output from the printer 200.

Further, the device 100 comprises a memory 132 that is readable by the printer 200 via the data interface 158 and/or configured to store operational data of the providing or arranging.

Optionally, the device 100 comprises a printing signal interface (for example, a sensor generally designated herein by reference numeral 104 and/or the data interface generally designated herein by reference numeral 158) configured to acquire a control signal for outputting the printed product 214. Optionally, the device 100 comprises at least one sensor 106 configured to acquire a control signal for providing the marking 101.

For example, the at least one actuator is configured to arrange the marking 101 on the object 102 in a circumferentially closed manner or to provide the marking 101 for circumferentially closed arrangement using the printed product 214 output by the printer 200, depending on the control signal for outputting the printed product 214 and the control signal for providing the marking 101.

Preferably, the device 100 further comprises an electrical interface 154 for supplying power to the device 100 via the printer 200. Alternatively or additionally, the device 100 may comprise its own power supply, such as a power supply for connection to a power grid or a rechargeable electrical energy storage device (such as a secondary cell).

A memory 132 (for example, a memory module of a control unit 130 or regulating unit 130 of the device 100) is incorporated in the device 100 (for example, an applicator) for storing operational data of the device 100. The operational data may comprise meter or counter readings, states (for example, operational states), state measurements, and/or histories of states or state measurements.

The counts may comprise a number of cuts made (for example, of the actuator 120), a number of markings 101 arranged (for example, of the actuator 122, i.e., the number of labels applied), and/or hours of operation. The states stored in memory 132 may comprise temperatures, electrical voltages (for example, the voltage of electrical interface 154 or the voltage of individual actuators 120 and 122), and/or electrical currents (for example, the current through electrical interface 154 or the current draw of individual actuators 120 and 122). The state histories stored in memory 132 may comprise time histories of individual or all states, for example, temperature histories, voltage histories, and/or current histories. Alternatively or additionally, the operational data may comprise state measurements, for example, force-displacement histories (preferably of individual or all actuators 120 and 122) or a change (for example, a degradation) in a state measurement (for example, a change in force-displacement history).

The state or the state measurement may be detected periodically in a course, for example with a time resolution or period duration of 1 minute or one day. Alternatively or additionally, the states may be detected in a history event-driven, for example when the device 100 is switched on (preferably when it is initialized) and/or when an action is performed by one of the actuators 120 or 122.

The operational data may be visualized on the display 209 of the printer 200 or may be retrievable at the user interface 209, for example, output from the control unit 230 or regulating unit 230.

The operator may see information about the current state (for example, meter or counter readings or force-displacement histories) and/or pending maintenance on the display 209 of the printer 200.

The maintenance (also: servicing) may be predictive maintenance. For example, based on the operational data, an estimation may be carried out as to whether and/or when maintenance (for example repair) is actually necessary, for example because a malfunction or failure of the respective component is to be expected due to a known or statistically detected aging process of individual components of the device 100 (for example one of the actuators 120 or 122). A possibly hasty or superfluous maintenance, in particular a routine or time-based preventive maintenance, may thus be avoided.

Preferably, the control unit 130 or regulating unit 130 sends the operational data (preferably only the operational data that is significant for the estimation) via the data interface 158 to the printer 200 (preferably to the control unit 230 or regulating unit 230) for (optionally aggregated) forwarding via the interface 222 to a local computer 300 (for example, in a local computer network) or a central computer 300 (also: server, for example, for various customers of a manufacturer of the device 100). Optionally, the operational data also comprises reports of faults, such as a malfunction or failure of a particular component. The reports on faults may be triggered by a malfunction or failure of the particular component of the device 100.

The computer 300 detects operational data from a plurality (for example, several thousand embodiments of the device 100).

Based on a statistical correlation between the operational data and the respective reports, a criterion is determined to the operational data at which the probability of the fault or change occurring with continued use of the device 100 (for example, in the next 3 or 6 months or with another 10% of the previous meter or counter readings) is above a certain threshold (for example, greater than 50%).

Figure 2:
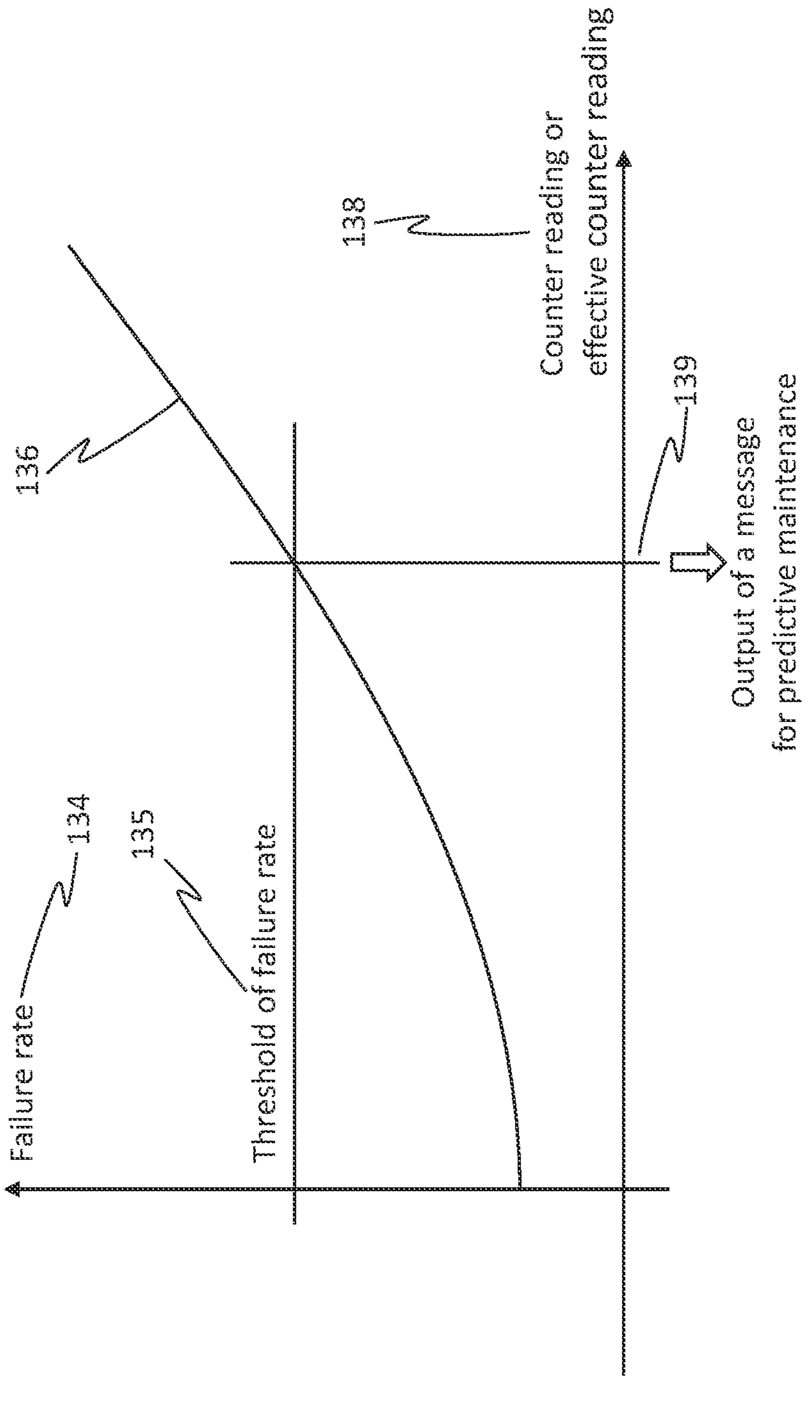
FIG. 2 schematically shows an example of a functional relationship between a failure rate and a meter or counter reading of the device.

FIG. 2 schematically shows a failure rate 134 of a component of the device 100 as a function 136 of a count 138 of the respective component. The component may be one of the actuators (for example 120 or 122) of the device 100, preferably including a mechanism driven by the actuator.

The failure rate 134 is preferably the probability of failure conditional on no failure having yet occurred (for example, the probability of failure divided by the probability that no failure has yet occurred). The failure probability or failure rate 134 as a function 136 of the meter or counter reading 138 may be calculated by the computer 300 (for example, local or central) based on operational data detected by a plurality of devices 100, for example, using grouping, classifying failures based on the meter or counter reading.

The failure rate 134 as a function 136 of the meter or counter reading 138 (or an equal effect or equivalent relationship) may be stored in the memory 132 of the device 100, for example as part of a firmware of the control unit 130 or regulating unit 130.

Failure may be defined by the operational data, for example, in the event that a force-displacement curve is outside a tolerance band, a temperature is above a temperature threshold value, and/or a current draw is above a current threshold value.

Above a threshold value 135 for failure rate 134, continued operation of the device 100 may be considered unreliable. A threshold value 139 of the meter or counter reading 138 may correspond to the threshold value 135 of the failure rate 134. Therefore, when the threshold value 139 of the meter or counter reading 138 is reached, a predictive maintenance message is output, preferably at the user interface 209 of the printer 200 and/or at the (for example, local or central) computer 300.

The threshold value 135 may correspond to a user reliability requirement for the operation of the device 100. The control unit 230 or regulating unit 230 of the printer 200 may query the threshold value 138 using the user interface 209. In this regard, the threshold value 135 may be input directly as a failure rate (for example, the probability of failure as a percentage in the next 100 or 1000 applications) or a multi-level (for example, two-level or three-level) division of the threshold value 135 may be queried. For example, a division of threshold value 135 may be "conservative" (for a first threshold value), "optimal" (for a second threshold value greater than the first threshold value), or "progressive" (for a third threshold value greater than the second threshold value).

In one variant of each embodiment, the message may be triggered (instead of by the respective meter or counter reading) by an effective meter or counter reading when the limit value is reached. For this purpose, the respective meter or counter reading may be increased by a correction value (i.e. the correction value is positive) or decreased (i.e. the correction value is negative):

Effective Meter or Counter Reading

=meter or counter reading+correction value.

The correction value is a function of a state (for example, a temperature or a current consumption of the respective component) and/or a measurement state (for example, a deviation of a force-displacement curve).

Preferably, the control unit 130 or the regulating unit 130 comprises a control function for service purposes, i.e., a control of the individual actuators (for example, 120 and 122) of the applicator 100 via the user interface 209. For this purpose, the control unit 130 or the regulating unit 130 comprises a separate mode for a service mode. For example, the service mode comprises a separate portion of a menu structure displayed at the user interface 209. The service mode (for example, the corresponding area of the menu structure) is preferably protected, for example, password protected. Access to this menu area requires the entry of a password. Alternatively or additionally, access to the service operation (for example, the corresponding area of the menu structure) may require password entry and/or confirmation for release at the (for example, local or central) computer 300.

In service mode (for example, using functions in the corresponding area of the menu structure), an operator may move individual actuators (for example, 120 and/or 122) of the applicator 100. Moving the actuators in service mode may comprise moving one or more pairs of rollers (for example, actuator 122 as an opening unit), a folding mechanism (for example, actuator 122), and/or a cutting mechanism (for example, actuator 120), and the like. This is useful for eliminating malfunctions and errors.

Optionally, the device 100 comprises a mechanical interface 152 configured to removably attach or mount the device 100 to a printer 200.

The firmware of the control unit 130 or regulating unit 130 of the applicator 100 may be manually and/or automatically updated by a function of the control unit 230 or regulating unit 230 of the printer 200. When the applicator 100 is connected to the printer 200 via the electrical interface 154, the printer 200 may request the type of applicator 100 connected, operational data (e.g., the number of cuts or the number of labels applied), and/or a firmware version of the applicator 100 as part of a communication via the data interface 158 (for example, during an initial communication or handshake).

If the operator then wishes to perform an update of the control unit 130 or regulating unit 130 of the applicator 100 (i.e., a firmware update of the applicator), this is possible via an interface of the printer 200, for example, via the interface 222, a network connection, or a connection for a serial data bus (e.g., the Universal Serial Bus or USB). A process of updating the firmware (i.e., an update process) is visualized on the display 209 of the printer 200. Preferably, an operator input (for example, selecting the displayed options) is performed at the display 209 as a user interface.

To prevent inadvertent interruption of a data link used for updating via the data interface 158 or an electrical power supply to the device 100 via the mechanical interface 154 during the process of updating the firmware, the mechanical interface 158 may be electromechanically locked before the process of updating the firmware begins and/or electromechanically unlocked after the process of updating the firmware ends.

Provided that the printer 200 is connected to the Internet via the user interface 222, the printer 200 may check whether the firmware on the applicator 100 is up to date using a remote network service (also: cloud service) or a server 300 when the applicator 100 is mounted. If it is not, the operator is asked, using the user interface 209, if they would like to perform an update (i.e., refresh).

The printing signal interface comprises, for example, data interface 158 configured to communicate with the printer 200 for providing the printed marking 101. The control signal for outputting the printed product 214 may be received by the printer (for example, its controller or control system generally designated by reference numeral 230). Alternatively or additionally, the printing signal interface comprises a sensor 104 configured to detect the output of the printed product 214.

For example, the sensor 106 of the device 100 is configured to detect the object 102, preferably the conductor 102, (for example, its presence and/or size, preferably width or diameter). Alternatively or additionally, the sensor 106 comprises a pushbutton whose actuation initiates the providing (or provisioning).

Through the material interface 156, the device 100 receives the printed product 214 output by the printer 200. The at least one actuator (for example, at least one of the actuators generally designated herein by reference numerals 120 and 122) of the device 100 may be configured (preferably controlled) to provide (for example, arrange) the marking 101 by means of (i.e., using) the printed product 214 output by the printer 200 in response to communication with the printer 200 (for example, via the data interface 158) and/or detection of the object 102 (preferably the conductor), for example, by means of the sensor 106.

For a concise description, and without limitation of the prolate object 102, a conductor is described below as an example of the prolate object 102.

Optionally, the device 100 comprises a control unit 130 or regulating unit 130 configured to control or regulate the at least one or each actuator (for example, the actuator 120 and/or 122) of the device 100, for example, according to a controlled variable whose actual value is detected by the sensor 106 as measured values. Alternatively or additionally, the control unit 130 or the regulating unit 130 may be configured to acquire the measured values from the at least one sensor 104 and/or 106 and send them to the printer 200 via the data interface 158. Alternatively or additionally, the control unit 130 or the regulating unit 130 may be configured to receive control commands for controlling or regulating the at least one actuator (for example, the actuator 120 and/or 122) from the printer 200 via the data interface 158 and/or to send control commands for controlling or regulating the printer 200 to the printer 200 based on measured values of the at least one sensor 106.

The printed product 214 may be a print medium 208 printed by the printer 200. The print medium 208 may be a printable tape (preferably plastic tape or adhesive tape) or a printable film (preferably plastic film or adhesive film). The printable film may comprise a self-adhesive layer on a side opposite the printing, or may be weldable to itself (preferably at an end) and/or to the conductor by the application of heat. Alternatively or additionally, the print medium 208 may comprise a tube (for example, a heat shrink tube).

The first actuator 120 (also: cutting unit) may be configured to cut the printed product 214. The cutting unit may be configured to cut through the printed product 214 in a transverse direction 121 transverse, preferably perpendicular, to the longitudinal direction of the printed product 214. Alternatively or additionally, the second actuator 122 may be configured to provide the cut printed product 214, preferably to arrange it on the conductor.

The marking 101 may comprise a portion of the printed product 214, for example a portion of the printed product 214 cut by the device 100 using the at least one actuator (for example, 120 and/or 122). The marking 101 may also be referred to as a label.

The marking 101 may be a printed wrap-around label, a printed flag label, or a printed section of the tube.

The application of the marking 101 to the conductor 102 may comprise a material connection of the marking 101 to the conductor 102. For this purpose, the marking 101 may be self-adhesive or bondable by heat. For example, the marking 101 may be a flag label that is wrapped around the conductor 102 during application and connected to itself in a two-dimensional manner at both ends of the marking 101. In another example, the marking 101 may be a wraparound label that is wrapped around the conductor 102 and connected to itself over a surface (or in a two-dimensional manner) during application. Alternatively or additionally, applying the marking 101 to the conductor 102 may comprise a positive-fit connection (for example, movable in the longitudinal direction of the conductor) of the marking 101 to the conductor 102. For this purpose, the marking 101 may comprise a tube (for example, a shrink tube) and/or a film (for example, a weldable thermoplastic film) that can be bonded to itself at the ends (preferably by the action of heat).

Applying the marking 101 to the conductor 102 by means of the at least one actuator 120 or 122 may comprise opening the tube and/or sliding the tube (for example the shrink tube) as the marking 101 onto the conductor 102, wrapping the marking 101 around the conductor 102, wrapping the marking 101 around the conductor 102 and closing the marking 101 as a flag label, inserting the marking 101 into a transparent grommet on the conductor 102, and/or printing a tag as the marking 101 that may be clipped around the conductor 102.

The device 100 may be configured to apply the marking 101 to the conductor 102 when the conductor 102 is already mounted (for example, when ends of the conductor are contacted and/or not free ends). For example, during application, the conductor 102 may not be rotated about a transverse axis transverse to the longitudinal direction of the conductor 102, may not be rotated about a longitudinal axis parallel to the longitudinal direction of the conductor 102, and/or may be at rest.

The marking 101 applied to the conductor 102 may be captive. Alternatively or additionally, a printed surface of the applied marking 101 may be flat or substantially free of curvature. For example, the printed surface may be arranged between two embossments. As a result, the printed surface may be easily readable and/or sufficiently large.

The marking 101 may be durable, for example in terms of printing (preferably in that the printer 200 is a thermal transfer printer), in terms of the material of the printing medium 208 (for example in that the printing medium is a plastic film), and/or in terms of the connection to the conductor 102 (for example in that the marking 101 is positively or materially (e.g., firmly bonded or adhesively) connected to the conductor 102).

A marking 101 may saving space, for example so that a plurality of conductors 102 each carrying such a marking 101 may be arranged closely together. Alternatively or additionally, the marking 101 may be displaceable and/or rotatable, for example by positively connecting the marking 101 to the conductor 102. This may allow the marking 101 to be aligned on conductors 102 (such as cables) that are in close proximity to each other.

The first embodiment example of the device 100 shown in FIG. 1 is mounted to an embodiment of the printer generally designated by reference numeral 200. While the embodiment of the printer 200 shown in FIG. 1 is shown and described in connection with the first embodiment of the device 100, the other embodiments of the device 100 may also be attachable (preferably alternately) to the embodiment of the printer 200.

The embodiment of the printer 200 comprises a print head 202, a print roller 204 (or platen roller), a photoelectric sensor 212 for detecting the print medium 208 (i.e., the material to be printed), for example, for detecting control holes, (for example, black) control marks, a beginning and/or an end of the print medium 208. The printing material 206 is, for example, a color ribbon.

The medium 208 to be printed is guided, along with the color ribbon 206, between the print head 202 and the platen 204. The photoelectric sensor 212 may detect a beginning of the printing medium 208 during printing to ensure positioning of the printed image within the portion of the printed product 214 by means of which the marking 101 is formed.

The printer 200 comprises interfaces that are spatially associated with and/or functionally correspond to the interfaces of the device, respectively. The spatially associated and/or functionally corresponding interfaces are connected or connectable to each other in pairs.

Preferably, the printer 200 comprises a mechanical interface 252 that is connected to, or is connectable to, or in communication or exchange or configured for communication or exchange with the mechanical interface 152 of the device 100. Preferably, the spatial association implies that when the mechanical interface 152 and 252 are connected (e.g., interlocked), the other interfaces of the device 100 and the printer 200 are also mutually connected or brought into communication or exchange.

Alternatively or additionally, the printer 200 comprises a data interface 258 that is connected or connectable to, or in communication or exchange with, the data interface 158 of the device 100. Alternatively or additionally, the printer 200 comprises a material interface 256 that is connected or connectable to, or in communication or exchange with, the material interface 156 of the device 100.

For example, the material interfaces 156 and 256 are in connection, or can exchange, the printed product 214. The data interfaces 158 and 258 are in communication or connection for exchanging measurement data from the respective sensors 104, 106, and/or 212 and/or control commands from the control unit 130 of the device and/or from a control unit 230 of the printer 200.

Optionally, as shown by way of example in FIG. 1, the printer 200 comprises an interface 222 to a computer or computer network 300 (for example, a connection to the Internet). The printer 200 (for example, its controller or control unit 230) may receive print jobs via the interface 222.

The device 100 for applying the marking 101 to the conductor 102 is also referred to as an applicator.

An embodiment of the applicator 100 (for example, the aforementioned first embodiment of the applicator 100) or a system comprising an embodiment of applicator 100 and an embodiment of the printer 200 (for example, the aforementioned embodiment of the printer) are configured to perform one or more of the following functions and method steps.

The applicator 100 and the printer 200 may perform operations (which are also referred to as actions), i.e., a set of one or plurality of process steps, alternately, in particular when applying the marking 101 to the conductor 102. In doing so, the applicator 100 and the printer 200 communicate with each other via the data interfaces 158 and 258, respectively, for example, in order to coordinate parameters and/or timing of the operations (preferably of the next operation in each case). The alternating execution of the operations is also referred to as interleaved operation of the applicator 100 and the printer 200.

In a first implementation, an overall procedure control (or sequence control) is stored (e.g., implemented or executably stored) in the printer 200, for example, in the control unit 230 (preferably by means of firmware stored in the control unit 230). The overall procedure control may comprise printing on the print medium 208 and applying the printed product 214 resulting from the printing.

A procedure control (or sequence control) of the applicator 100 may be stored (e.g., implemented or executably stored) in the applicator 100 and/or the printer 200. The procedure control of the applicator 100 may comprise (preferably exclusively) applying the marking 101 to the conductor 102 using the printed product 214. For example, the marking 101 is applied to the conductor 102 by executing the procedure control of the applicator 100.

In other words, executing the procedure control of the applicator 100 may be partially or entirely in the applicator 100 or exclusively executed in the printer 200. In any case, executing the procedure control of the applicator 100 causes the marking 101 to be applied to the conductor by means of the applicator 100.

In a first variant of the first implementation, the procedure control (e.g., sequence control) of the applicator 100 is stored in the printer 200. The applicator 100 preferably does not have any sequence control, for example, it also does not have a control unit 130. The control unit 230 of the printer (for example, the firmware of the printer 200 in the control unit 230) is configured to (preferably individually) control (or drive) the actuators (for example 120 and/or 122) or (preferably individually) query (or detect) the sensors (for example, 104 and/or 106) of the applicator 100 via the data interfaces 158 and 258.

In a second variation of the first implementation, the procedure control (e.g., sequence control) of the applicator 100 is stored (e.g., implemented or executably stored) in the applicator 100. For example, the applicator 100 comprises the control unit 130 or the regulating unit 130 in which the sequence control of the applicator 100 is stored (e.g., implemented or executably stored). Preferably, the control unit 130 or the regulating unit 130 is configured to control or regulate the applicator. For simplicity and without limitation, reference is made herein to the control unit 130, i.e., the function of a regulator (e.g., closed-loop control) is optionally comprised.

The execution of the procedure control (or sequence control) (preferably in the control unit 130) is started by the printer 200 (for example, the control unit 230, preferably by means of the printer firmware). For this purpose, the applicator 100 may receive a control command via the data interface 158 or may be energized via the electrical interface 154. As soon as an operation of the applicator 100 is required, the printer 200 (for example, the control unit 230, preferably by means of the printer firmware) sends a signal as a control command to the applicator 100 via the data interface 258 or 158.

Preferably, the printer 200 waits while the applicator 100 performs the requested operation (for example, initiated by the control command). As soon as the applicator 100 sends (e.g., reports) a signal via the data interface 158 or 258 as a control command of completion of the operation, the printer 200 continues execution of the overall procedure control.

Optionally, the signal from the applicator 100 to the printer 200 indicates a status of completion of the operation. For example, the status may indicate successful completion or an error that occurred during execution of the operation.

In a second implementation, the applicator 100, for example the control unit 130 (preferably using firmware of the applicator 100) executes the overall procedure control (i.e., the overall operation). In other words, the overall procedure control is stored (e.g., implemented or executably stored) in the applicator 100, for example, in the control unit 130 (preferably by means of firmware stored in the control unit 130). By executing the overall procedure control, the applicator 100 controls the overall flow.

The printer 200 acts as a slave in the overall operation. For example, the printer 200 has sovereignty over the printed image, i.e., the printer 200 (preferably its control unit 230) performs the printing as an operation of the printer 200 in response to a corresponding control command from the applicator 100. Optionally, the printer 200 issues a control command (i.e., a first start command) to execute the overall procedure control, for example, because only the printer 200 knows about the content and/or the presence of a print job.

To implement the interleaved (or alternating or nested) operation, the applicator 100 and the printer 200 exchange information (for example, measurement data and/or control commands) using the data interface 158 and 258, respectively.

The exchanged information may comprise measured values (for example, electrical voltages, electrical currents, electrical frequencies), preferably measured values of the sensor 104 and/or 106, which are transferred (i.e., sent) from the applicator 100 to the printer 200. Alternatively or additionally, measured values of a sensor of the printer (for example, the photoelectric sensor 212) may be transferred (i.e., sent) from the printer 200 to the applicator 100. The applicator 100 or the printer 200 may determine (for example, calculate) sequence control parameters based on the measurands (or measured values) and/or transmit the measured values or the parameters to the computer or computer network 300 (for example, to application software) via the interface 222.

For example, the sensor 106 may sense or acquire a diameter or circumference of the conductor 102 (or the prolate object about its longitudinal axis). The control unit 130 and/or the control unit 230 may determine a length of a feed of the printing medium 208 and/or a selection of the printing medium 208, for example, depending on the sensed or acquired diameter or circumference.

Furthermore, when a defined threshold value is exceeded, these measured values may be transferred as a digital signal (for example, either as a state "0" or a state "1") to the data interface 158 or 258, respectively, in order to indicate to the other (printer 200 or applicator 100) that a defined state (for example, the completion of an operation) has been reached.

For example, reaching an end position or a reference point of an actuator (for example, the actuator 120 and/or 122) may be indicated.

A reference move (or reference run) of an actuator of the applicator 100 (for example, the actuator 120 and/or 122) may be used to mechanically move an actuator (i.e., a drive connected to a mechanism of the applicator 100) to a determined position of the actuator (i.e., the mechanism), referred to as a reference position. A control command from the printer 200 or a process step of the operation, sequence control, and/or overall sequence control performed by the applicator 100 may comprise a movement (for example, a travel command) of the actuator, with the reference position serving as a reference point for the movements.

When the control unit 130 of the applicator 100 (for example, the applicator firmware) calculates one or more parameters of the applying (i.e., procedure control) from measured values (for example, transferred from the printer 200 or acquired from the sensor 104 and/or 106), the parameter(s) may be transferred to the control unit 230 of the printer 200 (preferably to the printer firmware thereof) in accordance with a communication protocol via the data interface 158 and 258. Furthermore, the control unit 130 of the applicator 100 (preferably its applicator firmware) may also use measurement data acquired by the printer 200 (for example, measurement data from the light barrier 212) to control the sequence control of the applicator (for example, as parameters of the applicator).

The printer 200 may be configured to print normal labels, for example, when no device 100 is attached to the mechanical interface 152 and/or the data interface 158.

The printer 200 may be a thermal transfer printer. The thermal transfer printer may provide high contrast and consistent marking 101. For example, the printer 200 may be a thermal transfer roll printer.

The embodiment of the printer 200 comprises an unroller 216 (or source roller) of the print media 208 disposed upstream of the print head 202, an unroller 218 of the print media 206 disposed upstream of the print head 202, and a rewinder 220 (or target roller) of the print media 206 disposed downstream of the print head 202.

An electrical interface 254 of the printer 200 is configured to supply electrical power to the applicator 100 attached to the printer via the electrical interface 154 thereof.

Optionally, the printer comprises a display 209, preferably user interface with a touch-sensitive screen. The control unit 230 and/or regulating unit 230 of the printer 200 may be in signal communication with the display 209, for example, to display a message or to select or enable a print job.

Figure 3:
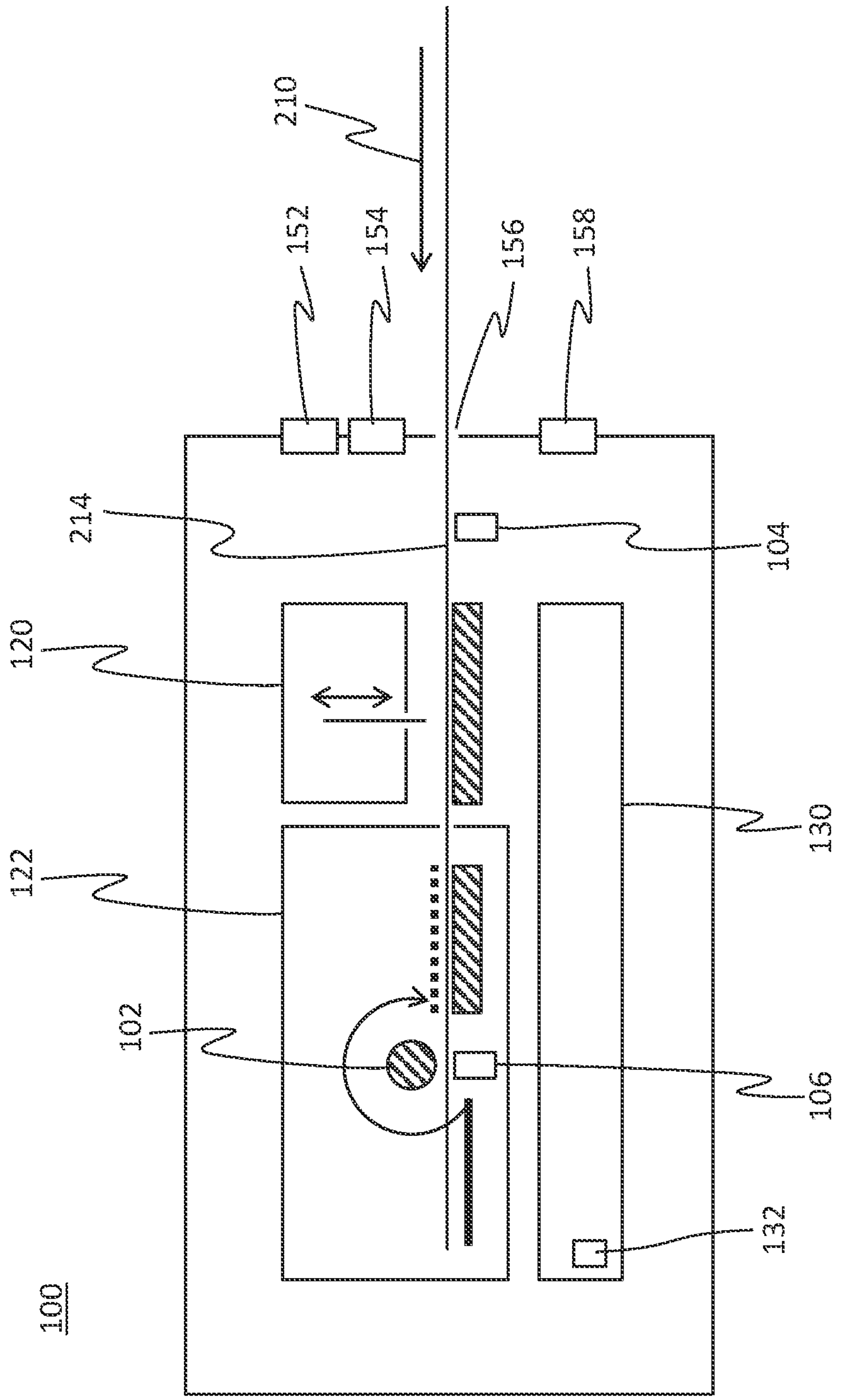
FIG. 3 a schematic sectional view of a second embodiment of the device for providing marking in a first state.
Figure 4A:
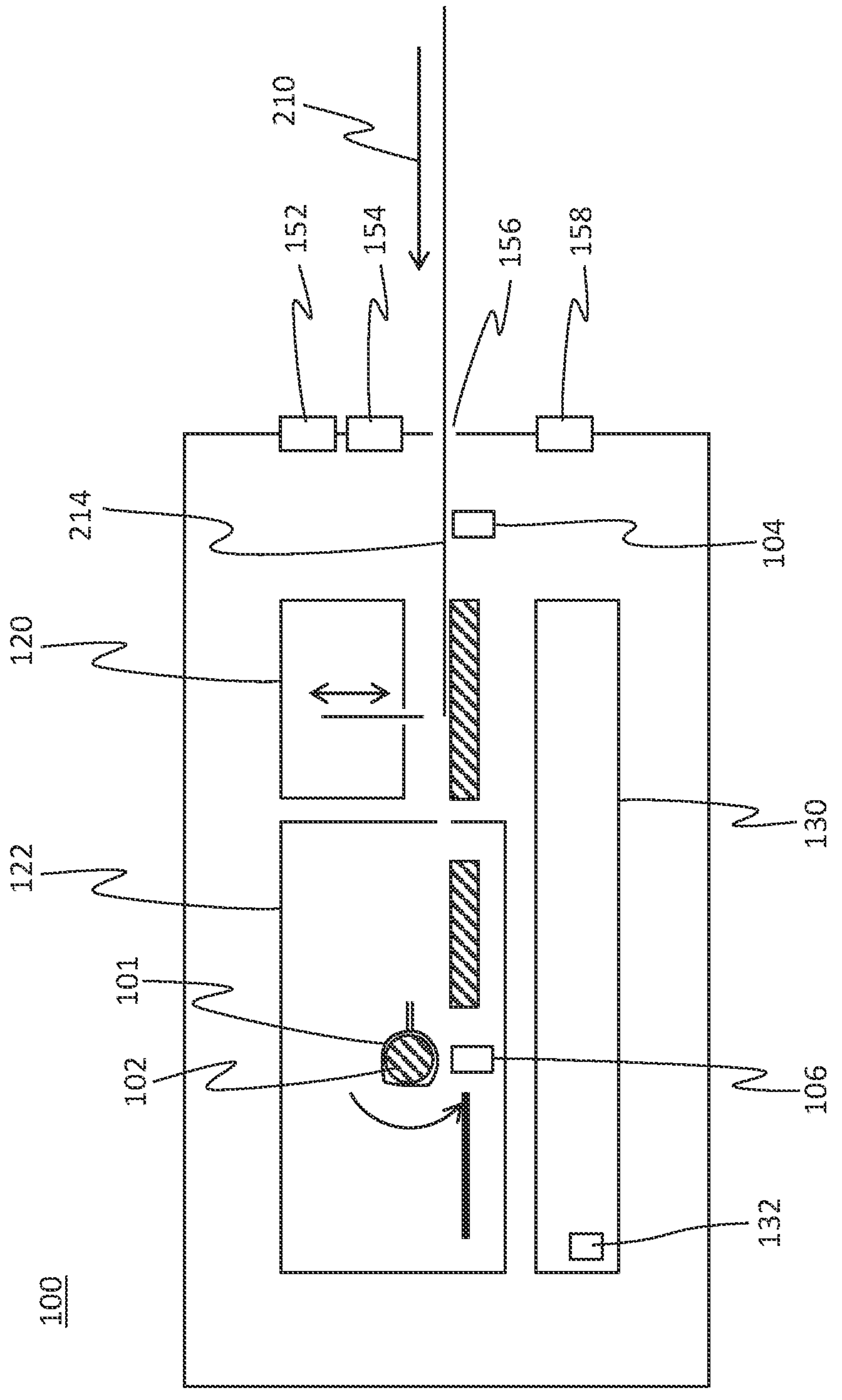
FIG. 4A a schematic sectional view of a second embodiment of the device for providing marking in a second state.

FIGS. 3 and 4A show a schematic sectional view of a second embodiment of the applicator 100 (i.e., the device 100 for applying) a printed marking in a first state and a second state of application, respectively.

The second embodiment of the applicator 100 may be implemented independently or in further variant of the first embodiment of the applicator 100. Features of the first and second embodiments of the applicator 100, denoted by the same reference numerals, may be identical or interchangeable.

The second embodiment of the applicator 100 is configured to strike or fold a printed film as a printed product 214 around the conductor 102 using a second actuator 122 of the applicator 100. Preferably, the sensor 106 determines the diameter of the conductor 102. The control unit 130 calculates a length from the diameter and controls the printer (more specifically, its printing roller 204) via the data interface 158 to feed the printed product 214 according to the determined length.

After the feed, for example in the first state shown in FIG. 1, the printer 200 signals via the data interface 258 (i.e., to the data interface 158) that the feed has been successfully completed, for example that the determined length has been reached. In response to the message from the printer 200, the control unit 130 controls the actuator 122 to wrap or fold the printed product 214 around the conductor 102. Further, the second actuator 122 (or, in one variant, a further actuator) is configured to heat weld together sections of the printed product 214 that lie flat on top of each other. Preferably, a first actuator 120 of the applicator cuts the welded sections to a flush end of the marking 101.

In a first variant of the second embodiment of the applicator 100, a portion of the surface surrounding the conductor 102 is printed and the flush cut end is short compared to the circumference of the conductor 102. Preferably, the applying, i.e., a step of the procedure control of the applicator 100, comprises two embossments performed on the printed product before and after the printed portion using the actuator 120, as schematically shown in FIG. 4A.

For example, the procedure control of the applicator 100 may comprise at least one of the following operations or steps. In one step, a control command is sent from the control unit 130 to the printer 200. The control command specifies the feed rate of the printed product 214 for a reference cut. In another step, in response to a notification of completion of the feed from the printer 200 to the applicator 100, the reference cut is executed by the actuator 120. A further step of the procedure control of the applicator 100 may comprise waiting until the presence of the conductor 102 is detected or acquired by means of the sensor 106. Another step of the procedure control (i.e., the procedure control sequence) of the applicator 100 may comprise acquiring the diameter of the conductor 102 by means of the sensor 106 and calculating parameters of the applying (for example, partial lengths for feeds of the printed product 214).

In a further step, a further control command is sent from the control unit 130 to the printer 200. The further control command specifies a first partial feed of the printed product 214 for a first embossing. In a further step, in response to a notification of completion of the first partial feed from the printer 200 to the applicator 100, the first embossing is performed by the actuator 120.

In a further step, a further control command is sent from the control unit 130 to the printer 200. The further control command specifies a second partial feed of the printed product 214 for a second embossing. In a further step, in response to a notification of completion of the second partial feed from the printer 200 to the applicator 100, the second embossing is performed by the actuator 120.

In a further step, a control command is sent from the control unit 130 to the printer 200 indicating a partial feed of the printed product 214 for a cutting position. In a further step, in response to a notification of completion of the partial feed for the cutting position from the printer 200 to the applicator 100, the cut is performed by the actuator 122, the printed product is wrapped or folded around the conductor 102, sealing portions of the printed product 214 brought into contact with each other in a planar manner, and a cut performed by the actuator 120.

Figure 4B:
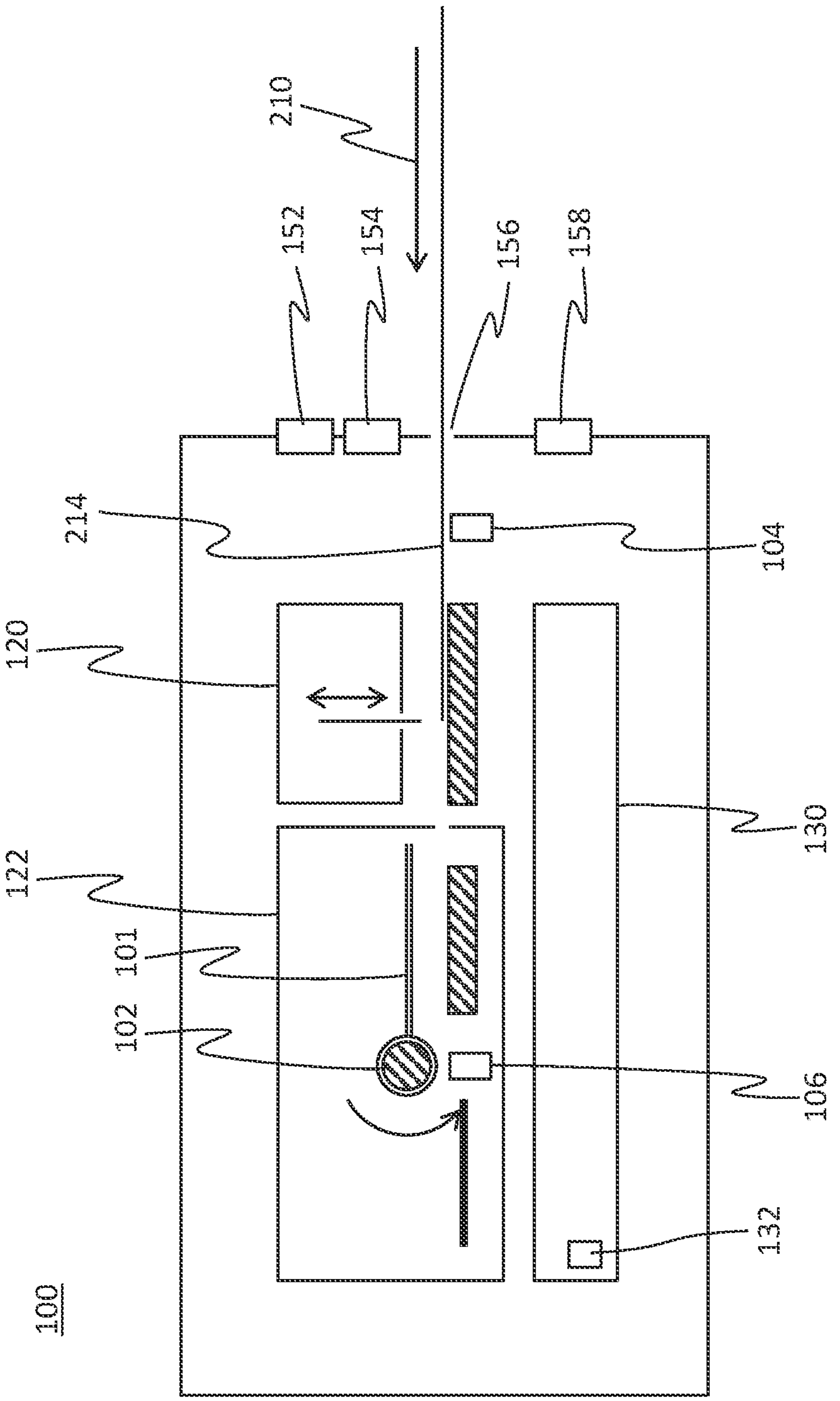
FIG. 4B a schematic sectional view of a variant of the second embodiment of the device for providing marking in a second state.

In a second variant of the second embodiment of the applicator 100, the flush cut end is equal to or longer than the diameter of the conductor 102 and comprises the printed portion of the printed product 214, as schematically shown in FIG. 4B.

Figure 5:
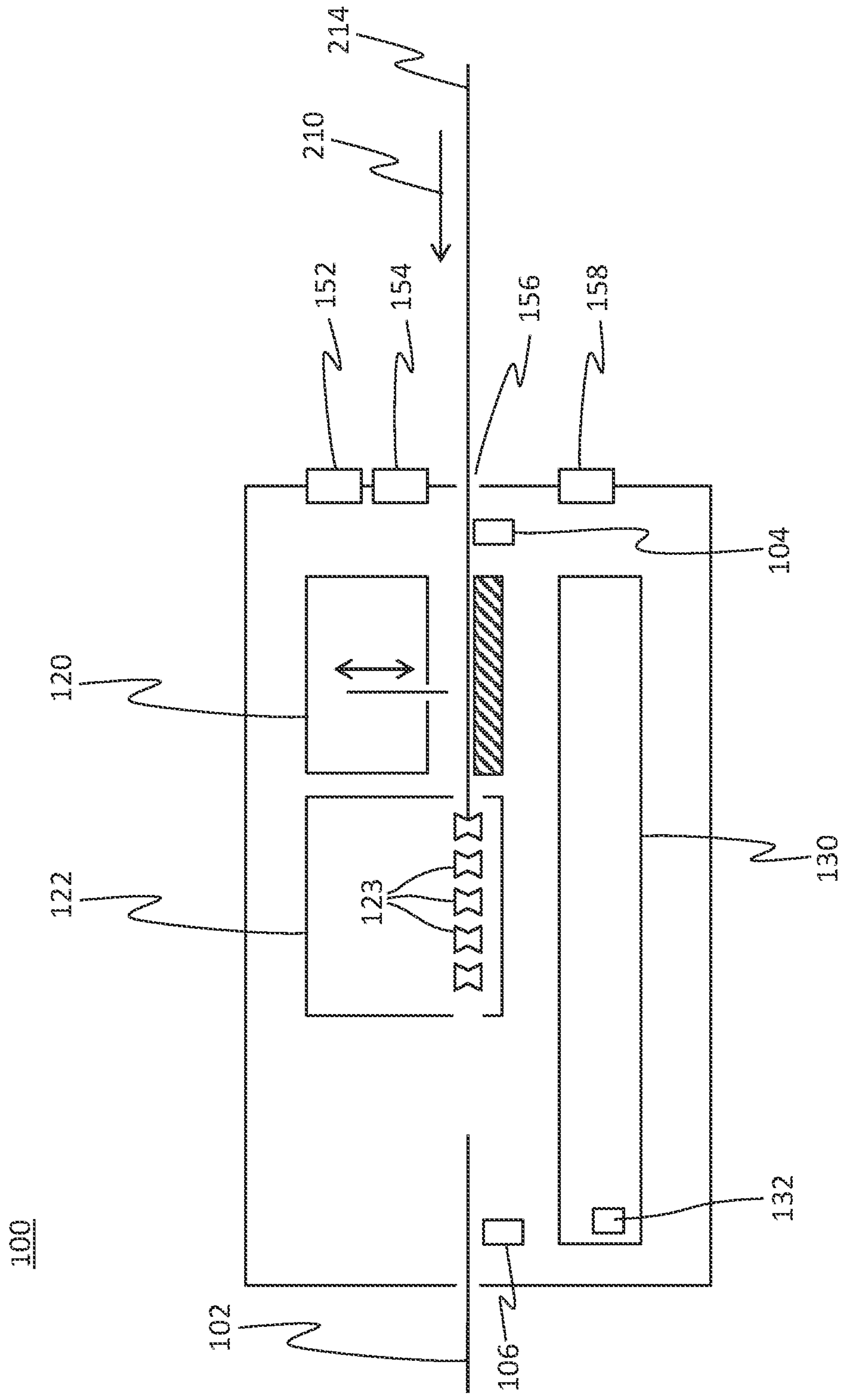
FIG. 5 a schematic sectional view of a third embodiment of a device for providing marking in a first state.
Figure 6:
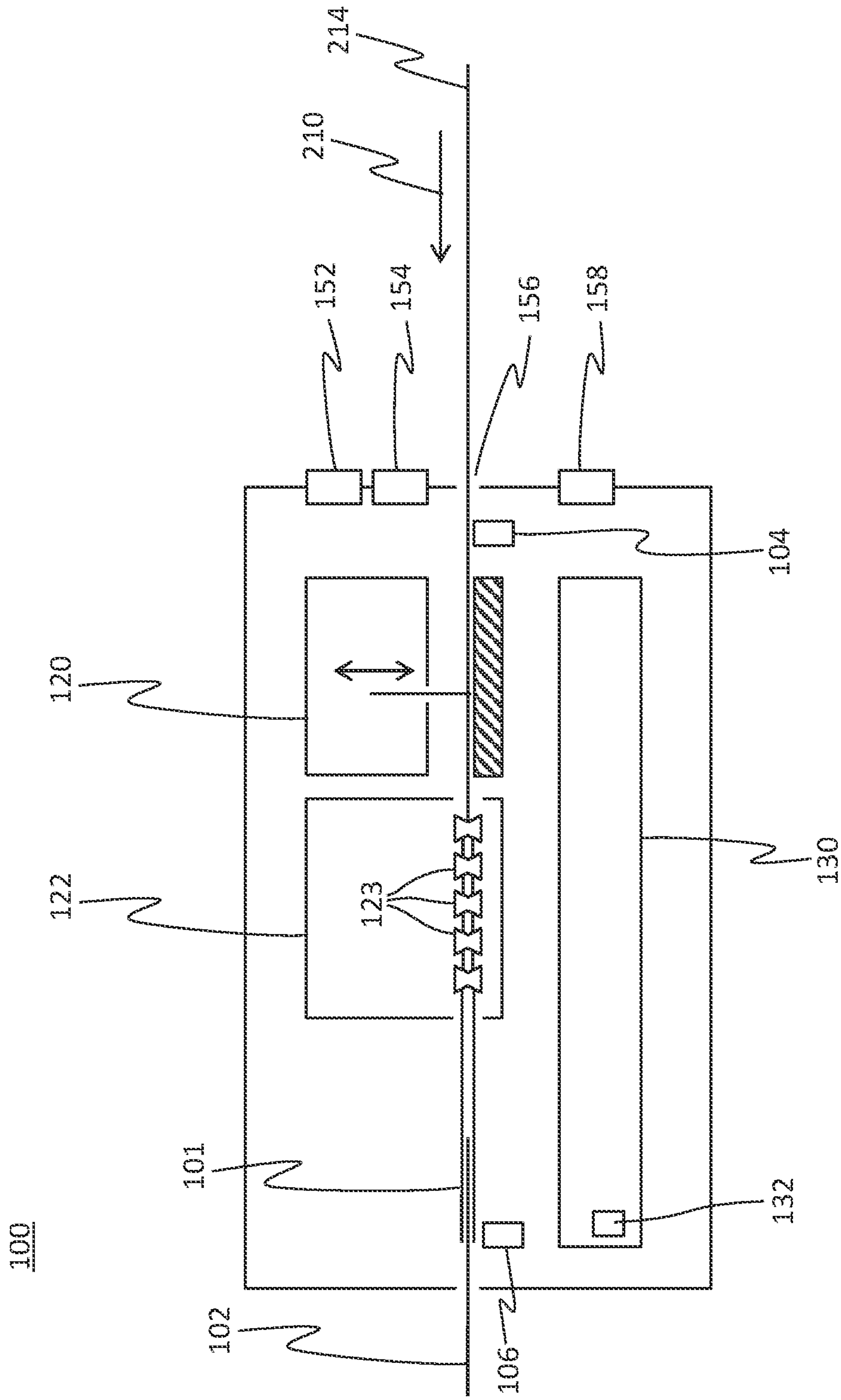
FIG. 6 a schematic sectional view of a third embodiment of a device for providing marking in a second state.

FIGS. 5 and 6 show a schematic cross-sectional view of a third embodiment of the applicator 100 (i.e., the device 100 for applying) a printed marking in a first state and a second state of application, respectively.

The third embodiment of the applicator 100 may be implemented independently or in further embodiment of the first and/or second embodiment of the applicator 100. Features of the first, second, and third embodiments of the applicator 100 designated by the same reference numerals may be the same or interchangeable.

The third embodiment of the applicator 100 is configured to slide or attach a tube (for example, a heat-shrink tube) as a printing medium 208 or a printed tube as a printed product 214 to the conductor 102. When the tube is printed and/or cut (for example, using the first actuator 120 of the applicator), the tube is pressed flat, whereby its cut end or at least a portion of the printed tube may be closed, i.e., the cut edge or the inner sides of the tube adhere to each other.

The second actuator 122 (also: opening unit) is configured to open the cut edge of the printed tube adhering together and/or the inner sides (for example, an upper tube half and a lower tube half) of the printed tube adhering together. To this end, the second actuator 122 comprises waisted rollers 123 that apply a force in pairs to opposite lateral edges of the printed tube 214 to open the cut edge of the tube and/or to release the inner sides of the tube from each other. In the schematic illustration of FIGS. 5 and 6, one of each of the pairs of oppositely disposed rollers 123 is visible as the pairs are aligned perpendicular to the longitudinal direction or direction of movement 210.

In the second state shown in FIG. 6, the printed tube is opened by means of the second actuator 122, pushed onto the conductor as a marking 101 due to a feed of the printer 200, and cut off at the end by means of the first actuator 120.

Figure 7:
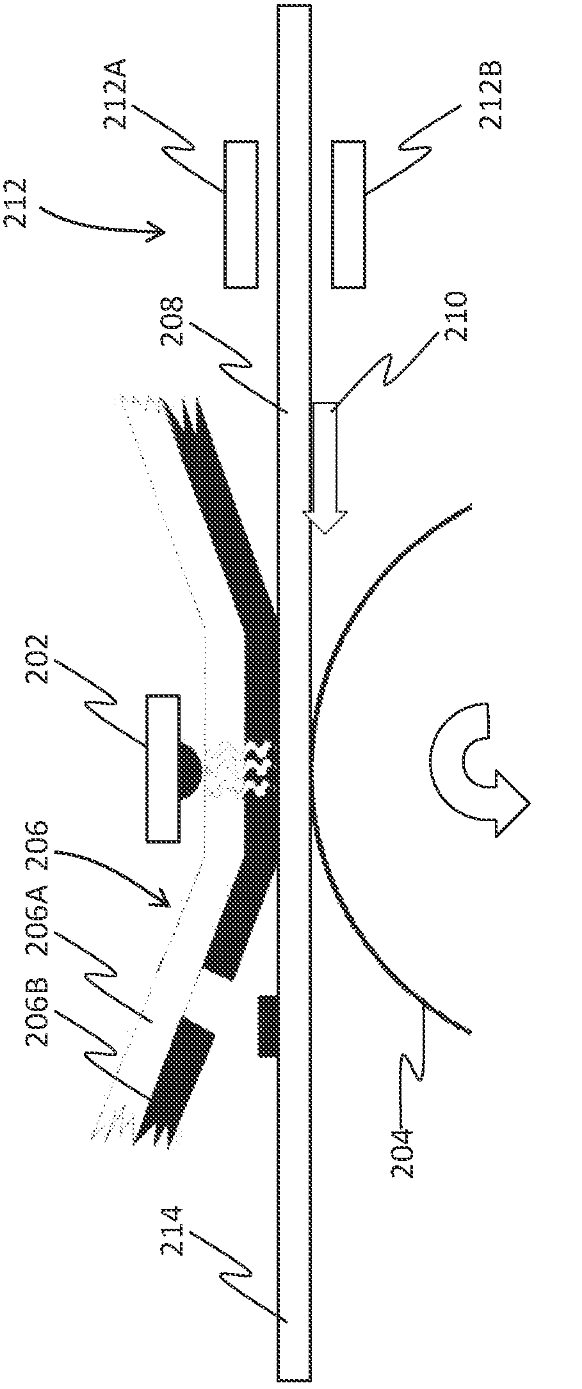
FIG. 7 a schematic sectional view of an embodiment of a printer as a thermal transfer printer.

FIG. 7 shows a further embodiment of the printer 200, which may be implemented independently or as a further development of the embodiment of the printer 200 described in the context of FIG. 1. Features of the embodiments designated by the same reference numerals may be identical or interchangeable. The further embodiment of the printer 200 is an example of a thermal transfer roll printer.

A control unit 230 of the printer 200 controls a feed and/or a retraction of the print medium 208 at the print head 202 and/or of the printed product 214 at the material interface 256 (and consequently at the material interface 156 of the device 100), depending on the signals from the photoelectric sensor 212 and/or control commands obtained from the device 100 via the data interface 258 (i.e., via the data interface 158 of the device 100). For this purpose, the control unit 230 may control a drive (for example, a stepper motor) for rotating the print roller 204.

The light barrier 212 may be arranged upstream of the print head 202 and/or the platen roller 204, with respect to a direction of movement 210 of the print medium 208 during advancement. The light barrier 212 may comprise, as exemplarily shown in FIG. 7, a light source 212A on the side of the print head 202 and a light sensor 212B on the side of the print roller 204. In a first variation, the positions of light source 212A and light sensor 212B may be interchanged. In a second variation, light source 212A and light sensor 212B may be arranged on the same side for detecting the print medium 208 in reflection.

The print head 202 comprises a plurality of heating elements. When the heating elements are heated (for example, energized) and the print roller 204 applies a predetermined (for example, sufficiently large) pressure to the print medium 208, the color pigments are transferred from the print material 206 (for example, a color ribbon) to the material to be printed. The control unit 230 may control the stepper motor to rotate the print roller 204 and control the energization of the heating elements of the print head 202.

The printing material 206 may comprise a plurality of layers. For example, the printing material 206 may comprise a carrier material 206A (for example, a carrier film) facing away from the print medium 208 and a color layer 206B (for example, a color wax) facing toward the print medium 208.

The printer 200 is preferably a tabletop device to which the device 100 may be attached as a replaceable or interchangeable module, for example, specific to an application or for the duration of a unified application process.

Figure 8A:
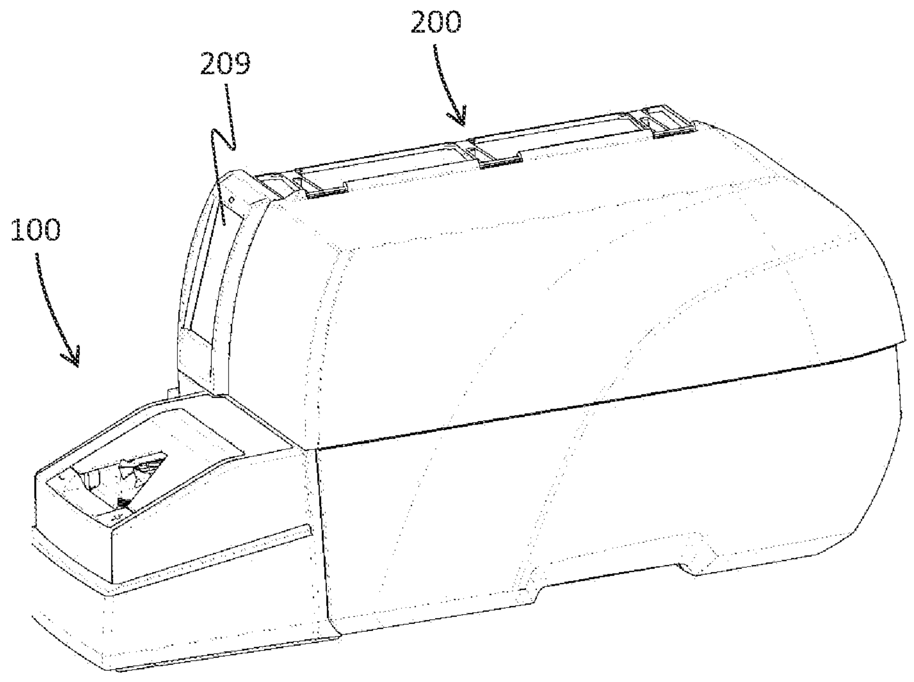
FIG. 8A a schematic perspective view of an exemplary printing system comprising an embodiment of the printer and an embodiment of the device for providing a marking, in a mounted position.
Figure 8B:
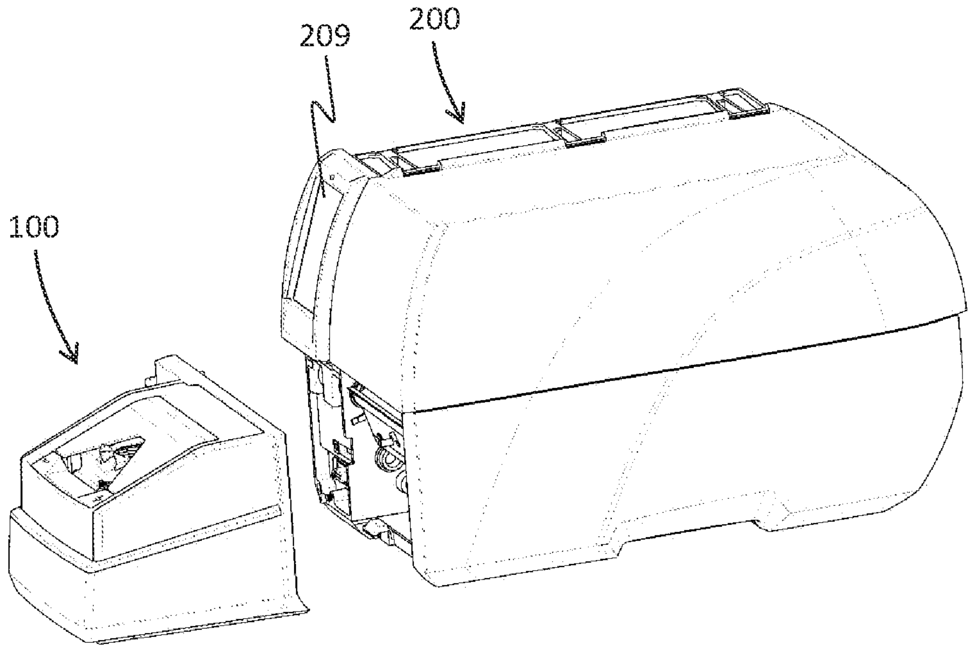
FIG. 8B a schematic perspective view of the exemplary printing system of FIG. 8A in a disassembled position.

FIG. 8A shows a schematic perspective view of an exemplary printing system (system for short), comprising an embodiment of the printer 200 and an embodiment of the device 100. In an exemplary mounted position of the device shown in FIG. 8A, all implemented physical interfaces are connected due to the arrangement of the device 100 on the printer 200. FIG. 8B shows a schematic perspective view of the exemplary printing system of FIG. 8A in a disassembled position. The physical interfaces are exposed.

Preferably, only the printer 200 comprises the user interface 209, which is also used by the respective mounted device 100.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Device for providing a marking,
  for example applicator 100
Marking (or label) 101
Prolate object, preferably conductor,
  for example copper conductor or optical fiber 102

Printing signal interface of a control signal to output the printed product,
for example sensor to detect print product 104
Sensor of a control signal to provide the marking,
for example sensor to detect the object or pushbutton for acquiring a provisioning request 106
First actuator of the device, for example cutting unit 120
Transverse direction 121
Second actuator of the device 122
Waisted rollers of the second actuator 123
Control unit or regulating unit of the device 130
Memory (or storage) of the device 132
Failure rate of the device or a component of the device 134
Threshold 135
Failure rate as a function of meter or counter reading 136
Meter or counter reading 138
Limit value 139
Mechanical interface of the device 152
Electrical interface of the device 154
Material interface of the device 156
Data interface of the device 158
Printer, for example thermal transfer printer 200
Print head of the printer 202
Print roller of the printer 204
Printing material, for example color ribbon 206
Carrier material of the printing material, for example carrier foil 206A
Color layer of the printing material, for example color wax 206B
Print medium of the printer (also: printing material) 208
Display, preferably user interface, of the printer 209
Feeding direction or longitudinal direction of the print medium 210
Printer light barrier 212
Light barrier light source 212A
Light barrier light sensor 212B
Printer printed product 214
Unwinder of the print medium 216
Unwinder of the printing material 218
Rewinder of the printing material 220
Printer interface, preferably network interface 222
Control unit or regulating unit of the printer 230
Mechanical interface of the printer 252
Electrical interface of the printer 254
Material interface of the printer 256
Data interface of the printer 258
Computer or computer network 300

The invention claimed is:

1. A device for providing a marking arranged or arrangeable in a circumferentially closed manner around a prolate object, comprising:

a material interface configured to receive a printed product output from a printer;

a data interface configured to communicate with the printer for a providing or arranging of the marking as a communication;

at least one actuator configured, using the printed product output from the printer, to arrange the marking on the object in a circumferentially closed manner or to provide the marking for circumferentially closed arrangement according to the communication with the printer via the data interface; and a memory readable by the printer via the data interface and configured to store operational data of the providing or arranging, wherein the control unit or regulating unit of the device is configured to indicate an error or a request for maintenance via the data interface on a display of the printer if the operational data reaches or exceeds a limit value, wherein the control unit or regulating unit of the device is configured to: forward the operational data to the printer via the data interface of the device and to a central computer via an interface of the printer for predictive maintenance of the device, and wherein the printer or central computer determines a component of the device to be replaced based on the operational data and requests the component from a warehouse via network access.

2. The device of claim 1, wherein the memory comprises a non-volatile memory.

3. The device of claim 1, wherein the data interface is configured to control, regulate, synchronize, or coordinate an alternating and/or event-driven operation of the at least one actuator and the printer for providing or arranging the marking, and wherein the memory is configured to store the operational data during each alternating and/or event-driven operation of the at least one actuator.

4. The device of claim 1, further comprising:

a control unit or regulating unit configured to control or regulate the at least one actuator of the device for the providing or arranging according to the communication with the printer via the data interface, and to detect and/or write the operational data of the providing or arranging into the memory.

5. The device of claim 4, wherein the control unit or the regulating unit is configured to send the operational data via the data interface to the printer for forwarding via an interface to a central server.

6. The device of claim 1, wherein a first actuator of the at least one actuator is configured to cut the printed product for the marking, and wherein a second actuator of the at least one actuator is configured to arrange the marking on the object in the circumferentially closed manner, or to provide the marking for circumferentially closed arrangement, using the cut printed product.

7. The device of claim 1, wherein the operational data comprises operating hours or one or more meter or counter readings of the at least one actuator.

8. The device of claim 1, wherein the operational data comprises one or plurality of states of the at least one actuator.

9. The device of claim 1, wherein the operational data comprises one state measurement or plurality of state measurements of the at least one actuator.

10. The device of claim 1, further comprising:

a mechanical interface configured to releasably or irreversibly mount the device to the printer; and/or an electrical interface configured to supply the device with electrical energy via the printer.

11. The device of claim 10, wherein the data interface and/or the electrical interface is arranged relative to the mechanical interface to contact the printer for communicating and supplying electrical power, respectively, when the device is mounted to the printer using the mechanical interface.

12. The device of claim 10, wherein the mechanical interface is electromechanically lockable and/or unlockable, and wherein the control unit or the regulating unit is configured to lock the mechanical interface before updating its firmware via the data interface and/or to unlock the mechanical interface after updating its firmware via the data interface.

13. The device of claim 1, wherein the device is configured as an applicator, stem, or attachment of the printer and/or is replaceable.

14. The device of claim 1, wherein the data interface is configured for wireless communication.

15. A printer for outputting a printed product to the device for providing the marking arranged or arrangeable around the prolate object in the circumferentially closed manner of claim 1, the printer comprising:

a material interface configured to output the printed product to the device as an output printed product;

a data interface configured to communicate with the device for providing or arranging the marking;

a control unit configured to control at least one actuator of the device by communicating via the data interface to arrange the marking in a circumferentially closed manner around the prolate object, or to provide the marking arrangeable around the prolate object in a circumferentially closed manner, by the output printed product; and a display, wherein the control unit or regulating unit is configured to read out operational data of the providing or arranging from a memory of the device via the data interface and to output the operational data using the display.

16. The printer of claim 15, wherein the control unit or regulating unit of the printer configured to control or regulate the at least one actuator by communicating with a control unit or regulating unit of the device to provide or arrange the marking.

17. The printer of claim 15, wherein the control unit or regulating unit of the printer is configured to display at a user interface at least one of the following functions as a selectable option:

an update of the firmware of the device;

a service mode of the device; and/or a change of a print medium of the printed product.

18. The printer of claim 15, wherein the control unit or regulating unit of the printer is configured to indicate an error or a request for maintenance using the display if the read-out operational data reaches or exceeds a limit value.

19. The printer of claim 18, wherein the control unit or regulating unit of the printer is configured to:

forward the operational data to a central computer via an interface of the printer for predictive maintenance of the device.

20. A system for providing a marking arranged or arrangeable in a circumferentially closed manner around a prolate object, comprising:

the printer of claim 15; and a device for providing the marking arranged or arrangeable in the circumferentially closed manner around the prolate object, the device comprising:

a material interface configured to receive a printed product output from a printer;

a data interface configured to communicate with the printer for a providing or arranging of the marking as a communication;

at least one actuator configured, using the printed product output from the printer, to arrange the marking on the object in a circumferentially closed manner or to provide the marking for circumferentially closed arrangement according to the communication with the printer via the data interface; and a memory readable by the printer via the data interface and configured to store operational data of the providing or arranging, wherein the material interface is arranged, relative to the printer, to receive the printed product output from the printer.

21. The device of claim 1, wherein the prolate object comprises a conductor.

22. The device of claim 6, wherein the second actuator comprises waisted rollers that apply a force in pairs to opposite lateral edges of the printed product to open the cut of the printed product and/or to release inner sides of the printed product from each other.

23. A device for providing a marking arranged or arrangeable in a circumferentially closed manner around a prolate object, comprising:

a material interface configured to receive a printed product output from a printer;

a data interface configured to communicate with the printer for a providing or arranging of the marking as a communication;

at least one actuator configured, using the printed product output from the printer, to arrange the marking on the object in a circumferentially closed manner or to provide the marking for circumferentially closed arrangement according to the communication with the printer via the data interface; and a memory readable by the printer via the data interface and configured to store operational data of the providing or arranging, wherein a first actuator of the at least one actuator is configured to cut the printed product for the marking, and wherein a second actuator of the at least one actuator is configured to arrange the marking on the object in the circumferentially closed manner, or to provide the marking for circumferentially closed arrangement, using the cut printed product, and wherein the second actuator comprises waisted rollers that apply a force in pairs to opposite lateral edges of the printed product to open the cut of the printed product and/or to release inner sides of the printed product from each other.

* * * * *